(12) United States Patent
Braspenning et al.

(10) Patent No.: US 6,963,664 B2
(45) Date of Patent: Nov. 8, 2005

(54) SEGMENTATION OF DIGITAL IMAGES

(75) Inventors: Ralph Antonius Cornelius Braspenning, Eindhoven (NL); Fabian Edgar Ernst, Eindhoven (NL); Cornelius Wilhelmus Antonius Marie Van Overveld, Eindhoven (NL); Piotr Wilinski, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 732 days.

(21) Appl. No.: 09/945,874

(22) Filed: Sep. 4, 2001

(65) Prior Publication Data

US 2002/0048402 A1    Apr. 25, 2002

(30) Foreign Application Priority Data

Sep. 7, 2000    (EP)    .................................. 00203079

(51) Int. Cl.⁷ .............................................. G06K 9/34

(52) U.S. Cl. ...................................... 382/173; 382/180

(58) Field of Search ............................... 382/133, 171, 382/173–206

(56) References Cited

U.S. PATENT DOCUMENTS

| | | | | |
|---|---|---|---|---|
| 5,629,989 A | * | 5/1997 | Osada | 382/281 |
| 5,859,929 A | * | 1/1999 | Zhou et al. | 382/175 |
| 5,870,494 A | * | 2/1999 | Kanda et al. | 382/197 |
| 5,896,466 A | * | 4/1999 | Kim | 382/242 |
| 6,393,061 B1 | * | 5/2002 | Owechko | 375/240.29 |
| 6,654,497 B1 | * | 11/2003 | Kondo et al. | 382/199 |

OTHER PUBLICATIONS

Satoshi, Suzuki "Graph-based vectorization method for line patterns", Computer Vision and Pattern Recognition, pp. 616-621, Jun. 1988.*

"Seeded Region Growing" by Rolf Adams and Leanne Bischof, in IEEE Transactions on Pattern Analysis and Machine Intelligence, vol. 16, No. 6, Jun. 1994, pp. 641-647.

* cited by examiner

*Primary Examiner*—Samir Ahmed
*Assistant Examiner*—Brian Le (57) ABSTRACT

A method for segmenting a digital image composed of pixels, including determining hard border fragments in the digital image by means of an edge detection process, determining respective sides of each of said hard border fragments, and forming segments by determining for each pixel a closest side and by uniquely assigning each pixel of said digital image to a single segment, corresponding with the determined closest side to the respective pixel.

10 Claims, 5 Drawing Sheets

SEGMENTATION OF DIGITAL IMAGES

The invention relates to segmenting a digital image composed of pixels, including determining border fragments in the digital image by means of an edge detection process.

Image segmentation is used in image processing to divide an image into separate parts, or segments. Segmentation is an important step in most processes for image analysis.

According to "Image processing, analysis and machine vision" by M. Sonka, V. Hlavac and R. Boyle, second edition, 1998, p. 123, image segmentation is one of the most important steps leading to the analysis of processed image data—its main goal is to divide an image into parts that have a strong correlation with objects or areas of the real world contained in the image. Complete segmentation results in a set of disjoint regions corresponding uniquely with objects in the input image. In partial segmentation, regions do not correspond directly with image objects. If partial segmentation is the goal, an image is divided into separate regions that are homogeneous with respect to a chosen property, such as brightness, color, reflectivity, texture, etc. Segmentation methods can be divided into three groups according to the dominant features they employ: First is global knowledge about an image or its part; the knowledge is usually represented by a histogram of image features. Edge-based segmentations form the second group, and region-based segmentations the third—many different characteristics may be used in edge detection or region growing, for example, brightness, texture, velocity field, etc. The second and third groups solve a dual problem. Each region can be represented by its closed boundary, and each closed boundary describes a region.

It is an object of the invention to provide advantageous segmentation of an image. To achieve this objective, the invention provides a method and device for segmenting an image, a computer program, a tangible medium, a signal and a display apparatus as defined in the independent claims.

In a first embodiment of the invention, a digital image composed of pixels is segmented by determining hard border fragments in the digital image by means of an edge detection process, determining respective sides of each of said border fragments, forming segments by determining for each pixel a closest side and by assigning each pixel of said digital image to a segment, corresponding with the determined closest side to the respective pixel. The method according to the invention is robust and stable and leads to an effective segmentation suitable for use, for example, in general image processing. The method can be implemented such that segmentation can be achieved with relatively limited calculation resources.

Known methods that are suitable for general image processing have the problem however that they are not robust, i.e. they do not reliably deliver relevant results, for example due to numerical instabilities. Other known methods have been optimized for a specific application and tend to achieve higher levels of robustness for their specific application, but are unsuitable for general application.

The segmentation according to the invention lend itself to be implemented in universal image processing hardware for use with for example MPEG (de)coding and television scan rate conversion.

According to a preferred embodiment of the invention, an image is divided into segments by subsequently forming segments wherein the detected hard border fragments bound at least part of the segments. The border sections that are not made up of detected edge sections are formed by determining for each pixel the closest detected edge. These border sections are called soft border fragments.

Particularly advantageous elaborations of the invention are set forth in the dependent claims. Further objects, elaborations, modifications, effects and details of the invention appear from the following description, in which reference is made to the drawing, in which

In the following example of an embodiment of the invention, a digital image will be segmented into separate regions. The digital image is composed of image pixels. Segments to be formed in the image are bounded by borders or border lines; pixels within the borders of a segment belong to that segment. Therefore, the determination of the borders leads to the determination of the segments. To obtain borders or at least fragments of borders, the digital image is processed to find edges in the image using an edge detection process, in which image features are analyzed. Edges that are detected result from image features, and have therefore a high probability to be a boundary between image objects. According to the invention, the edges detected by the edge detection process are used as fragments of the borders between the segments to be determined. These border fragments resulting directly from image information are called hard border fragments or high probability border fragments.

Figure 1:
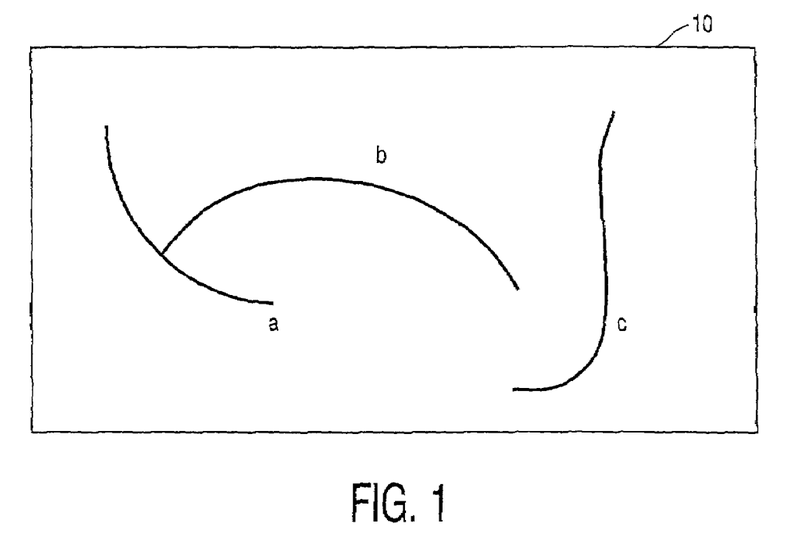
FIG. 1 shows hard edges in an image.

In FIG. 1, hard border fragments detected in the image with an edge detection method are shown in image 10 which has the same size as the digital image. Three hard border fragments have been detected, border fragments a, b, and c respectively. Note that border fragment b is incident at border fragment a; this topography is known as a bifurcation.

Edge detection methods per se are well known in the art. In this example the hard border fragments are determined by high contrast borders, which are a good indication of a border between image elements. The invention is not limited to edges determined by high contrast; the invention can be used with other criteria for border fragments between image elements such as color, luminance, or texture. According to the invention, edges can be detected by any suitable method for carrying out edge detection.

Figure 2:
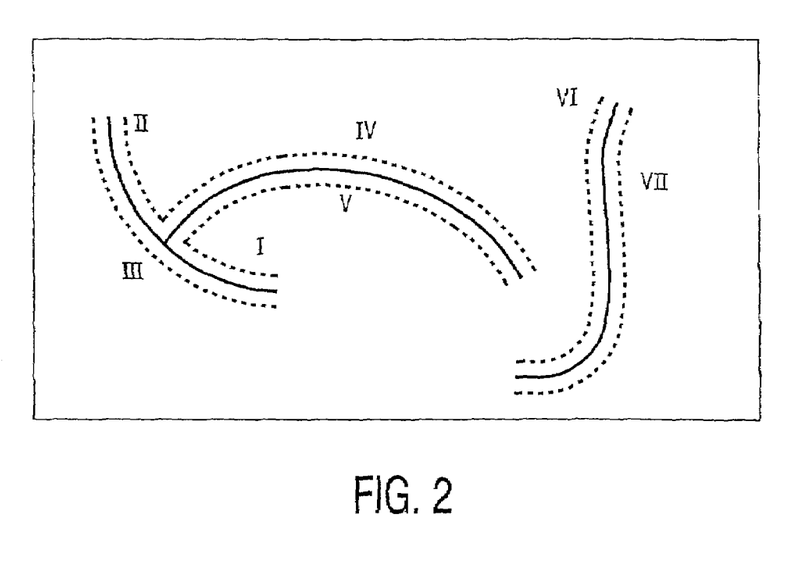
FIG. 2 shows seeds associated with the hard edges of FIG. 1.

The hard border fragments a, b, c bound part of a segment; the borders of the segments are not complete however. The other sections of the borders have to be established. According to the invention, the other border sections are determined by the distance to the closest hard border section. To obtain the other border sections, sides of the border fragments a, b, and, c are defined and uniquely labeled. As shown in FIG. 2, border section b has a first side IV and a second side V, and border section c has therefore a first side VI and a second side VII. Border section a has a first side III; the other side of border section a is divided in two sections by border section b in the position where border b intersects border section a. The respective sections are sides I and II of border section a.

Figure 3:
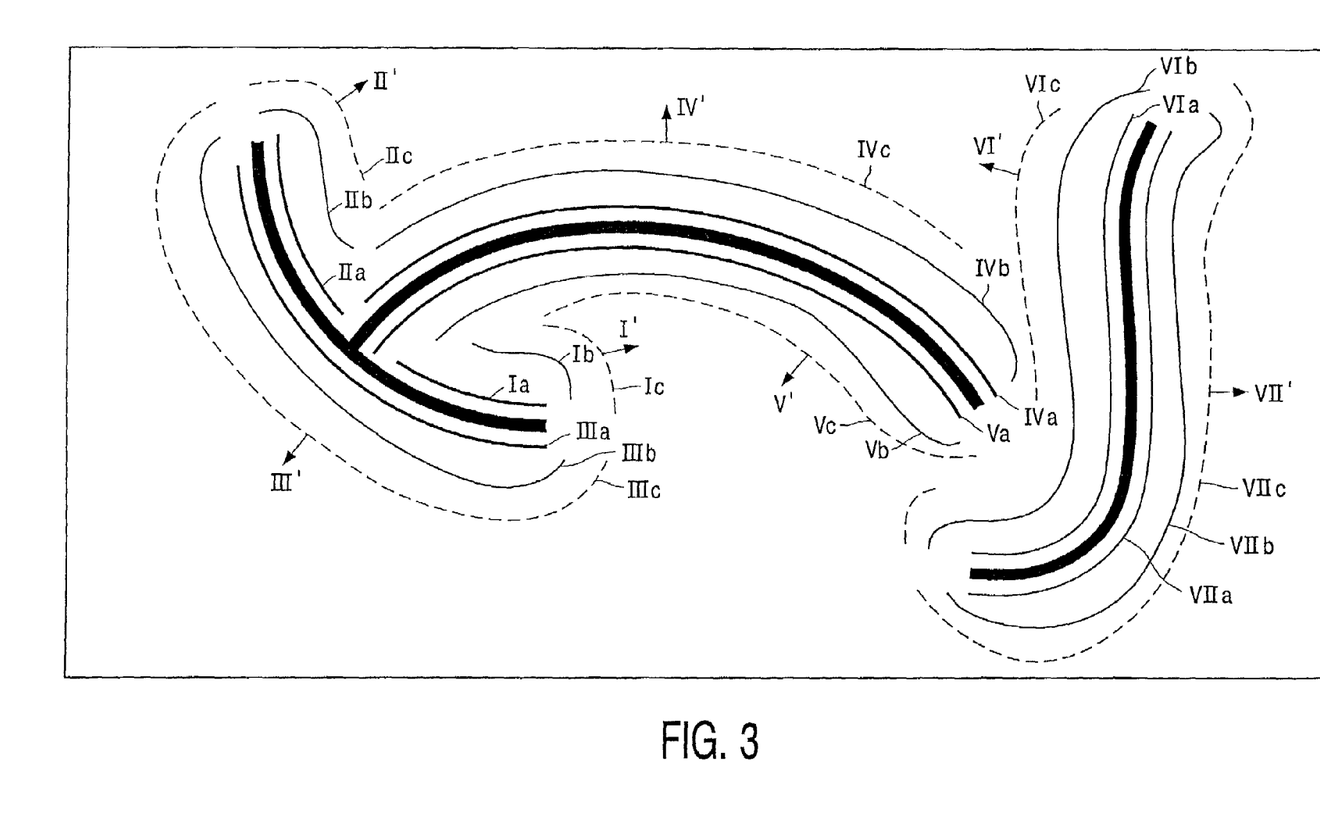
FIG. 3 shows fronts expanding from the seeds of FIG. 2.
Figure 4:
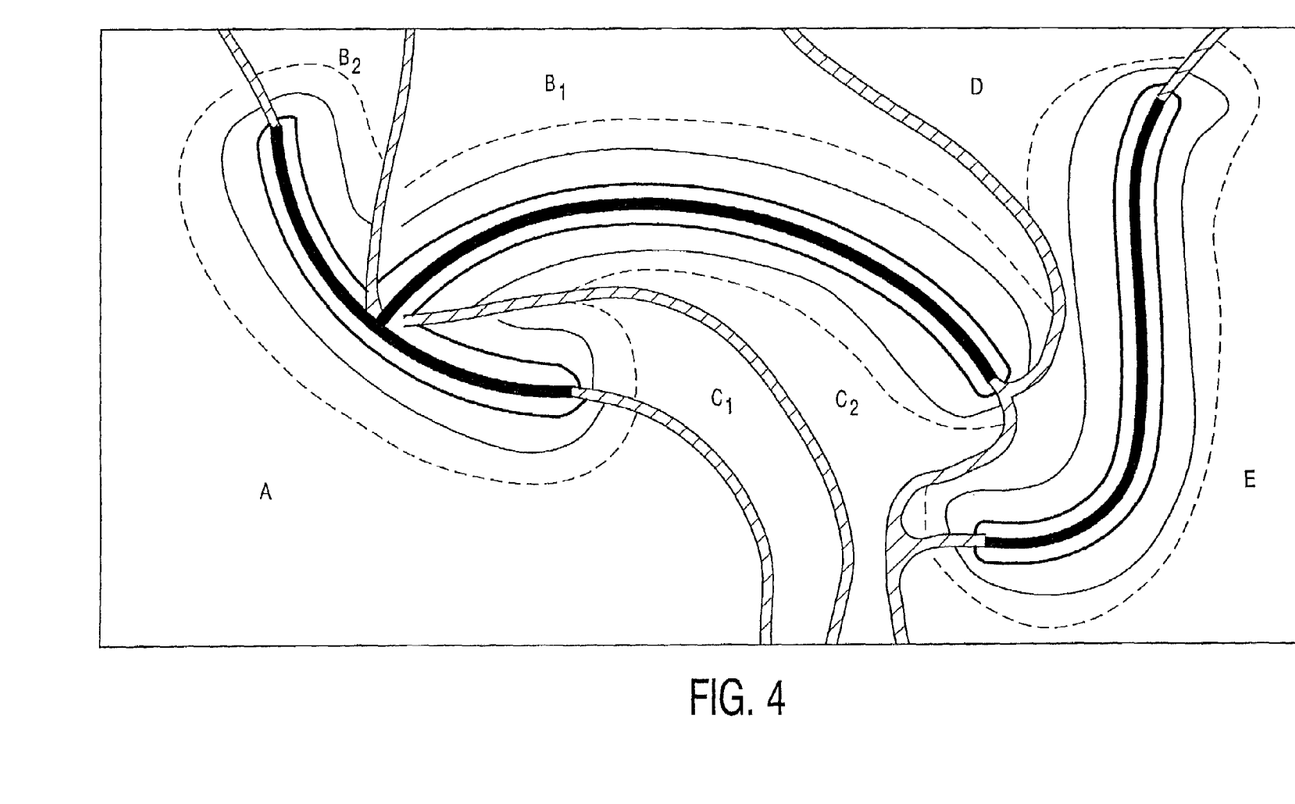
FIG. 4 shows image segments determined by segmentation according to the invention.
Figure 5:
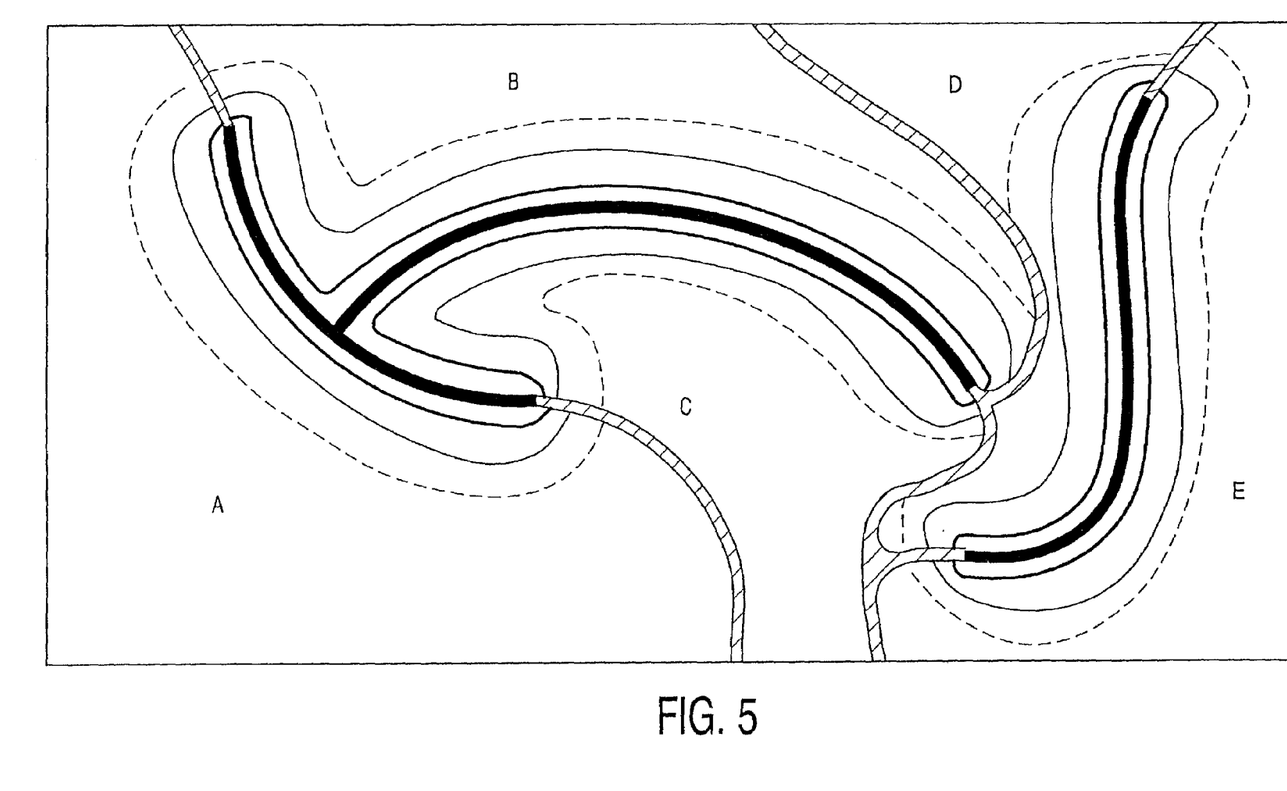
FIG. 5 shows the image segments of FIG. 4 after post-processing.

To obtain the other boundaries, the sides I–VII are expanded in a direction away from the border fragment from which they originate, the respective expansion directions being indicated by arrows I'–VII' in FIG. 3. Preferably, the direction of expansion is essentially perpendicular to the previous front. A number of expanding fronts, labeled Ia/b/c–VIIa/b/c, respectively, have been indicated in FIG. 3, wherein the suffix -a denotes fronts close to the original edge, and the suffixes -b and -c respectively denote subsequent fronts further from the original border fragment. In fact each front is the locus of point having the same distance to the closest border fragment. Where the expanding fronts meet neighboring expanding fronts, a border fragment is formed, as indicated by the hatched lines in FIG. 4. These border fragments are called soft border fragments, as they do not derive directly from information of the image. The soft border sections are essentially contiguous to the end sections of hard border sections. Non contiguous soft border sections can however occur, e.g. when hard border sections extend up to the edge of the image. The probability that a soft border is a part of a border of a segment is lower than that of the aforementioned hard borders. After full expansion of the fronts up to the edge of the image, segments are defined as shown in FIG. 4, indicated by capitals A–E. The soft boundaries are labeled by the two segments they divide. As a result the complete image has been divided in segments A–E, wherein each segment is bound at least partially by a hard border and further by soft borders or the image edge. Subsequently, the obtained segmentation is scanned for oversegmented regions, that logically form a single segment. In this example the borders between segments B1–B2 and C1–C2 are redundant, as a result of oversegmention, caused by the bifurcation of border a and b. After detection of such oversegmentation, the segments B1, B2 and C1, C2 are merged.

Consequently, image pixels can uniquely be assigned to a segment, bound by the hard and soft borders sections, as established in the above-explained manner. Note that the segments consist of groups of pixels that share the same closest side of a hard border fragment.

Figure 7:
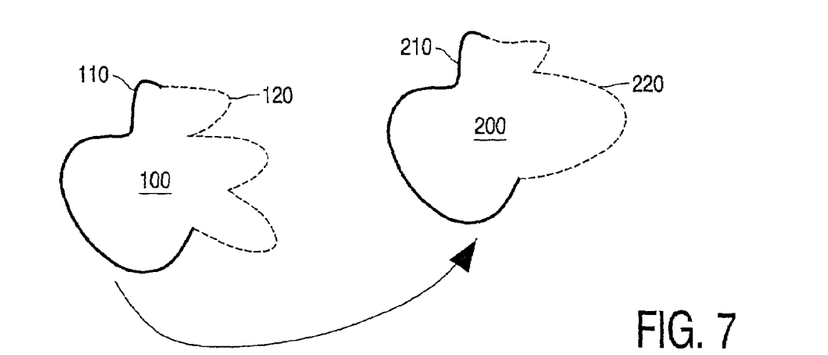
FIG. 7 shows an illustration of matching quasi segments.

The segmentation as obtained with the method according to the invention is called a quasi segmentation, wherein some sections of the boundaries of the segments are less strict defined, with a lower degree of certainty (the above described soft border sections). This quasi segmentation has the advantage that it results in a segmentation which is accurate in sections of the borders where the segmentation can be determined easily, and less accurate in sections where determination is more difficult. This results in significantly decreased calculation costs, and increased calculation speeds. The quasi segments can for example be used in matching of segments in subsequent images. For example in FIG. 7, the segment 100 on the left is determined by quasi segmentation, with a hard border section 110 and a soft border section 120. In a subsequent image, the projection of the segment 100 to the segment 200 has a hard border section 210 and a soft border section 220. The hard border section 210 is a projection of the border section 110; although in this example the border sections 210 and 110 are similar in shape, this does not need to be case. The hard border sections 110 and 210 remain the same in subsequent images, and therefore segments 100 and 200 can successfully be matched by comparing the high certainty border sections. The soft border sections 120 and 220 are different in the subsequent images. However, less importance is given to these low certainty borders in the matching procedure.

In the following, an example of an implementation of the invention will be described. The digital image to be segmented in this example is a discrete image IM (x, y) with pixels (x, y) of a resolution N×M, wherein N and M are integers. A binary picture I(x,y) with pixels (x, y) of resolution N×M is defined; the binary picture I(x, y) is used for the determination of the segments of the image IM as hereinafter described. Also defined are an array d(x, y), called the distance array with size N×M and an array b(x, y), called the item buffer, again with size N×M. In the distance array d(x, y) for every pixel (x, y) the distance to a closest seed (as defined below) is stored; the determination of this distance will be explained in the following. In the item buffer array b(x, y) is stored for every pixel (x, y) the identity of the closest seed or border fragment; in the following the determination of the closest seed or border will be explained.

First, the digital image IM is processed with an edge detector to determine well defined edges; this step is similar to the detection of hard border fragments in the first example embodiment. By way of example the known Marr-Hildreth method is used in this embodiment, as described by E. C. Hildreth, in "The detection of intensity changes by computer and biological vision systems" published in 1983 in Computer vision, graphics and Image processing, pag. 22:1–27. The Marr-Hildreth algorithm uses zero crossings of a Laplacian of Gaussian (LoG) operator to detect border fragments.

Figure 6:
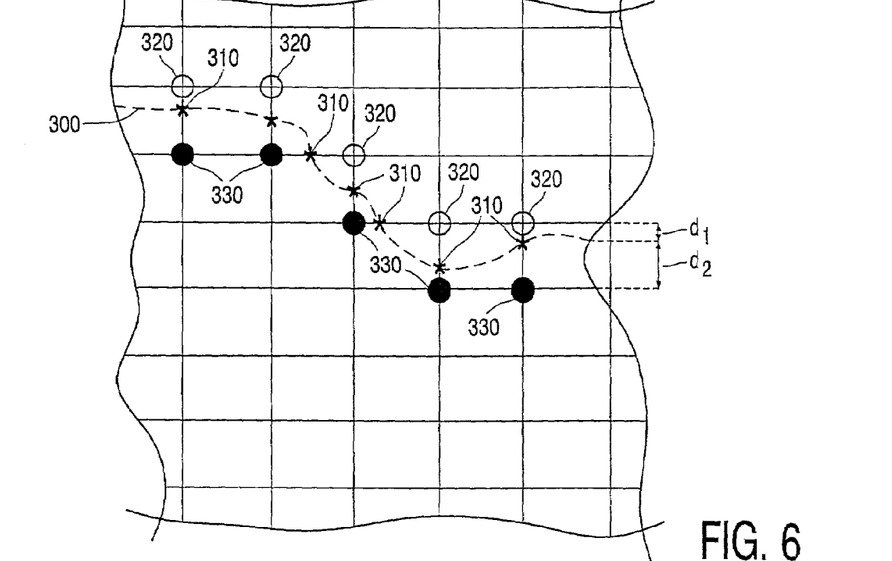
FIG. 6 shows a segment boundary with seed points.

The Marr-Hildreth method detects zero crossings of the LoG in between two pixels of the discrete image IM, which are considered hard border fragments as in the first embodiment. In FIG. 6, a section of an image matrix is shown, with the intersections of the grid indicating the location of the pixels. The line 300 indicates the zero crossings, indicated by the asterisks (*) 310, detected by means of the LoG operator. The hard borders found in the image by the LoG zero crossings detection are mostly extended contiguous sequences of inter pixel positions. With each zero crossing, that lies between two pixels, two seed pixels are associated on either side of the crossing; the border 300 passes in between the two seed pixels. In this embodiment, a seed consists of seed pixels, wherein seed pixels are the pixels of the image that are closest to the hard border sections. The seeds form an approximation of the border sections within the digital image pixel array; as the seeds fit within the pixel array, subsequent calculations can be performed easily. According to the invention other methods of determining seeds on basis of found hard border sections can be used. The pairs of seed pixels opposite the border 310 are indicated by the circles 320 and the black dots 330 in FIG. 6.

Seed pixels are defined all along the detected hard border 300, giving rise to two-pixel wide double chains. Each chain of seed pixels along a side of the border (i.e. each one-pixel wide half of the double chain) is regarded as a seed, and accordingly indicated by a unique identifier. As the hard border in this example is defined by a zero crossing of the LoG operator, the value of LoG is positive on one side of the border and negative on the other side. Identification of the different sides of the border can be achieved according to an embodiment of the invention by using the sign of the LoG operator. This is advantageous as the LoG operator has already been calculated during the process.

As a result of the LoG based edge detection the seed pixels essentially form chains; the invention is however not limited to chain shaped seeds. According to the invention seeds can be arbitrarily shaped clusters of edge pixels, in particular seeds having a width of more than a single pixel.

In the item buffer b(x, y), the value corresponding with the position of a seed point is given the value of the unique seed identifier. Initially, all other pixels, which are not seed points, do not have a seed identifier number in the item buffer b(x, y), but are given a value that does not correspond to a seed identifier number.

For each pixel of the image IM(x, y) which is found to be a seed pixel, the pixel with the corresponding coordinates (x, y) in the binary image I is given the value 1. All other pixels in the image I are given the value 0.

By means of for example linear interpolation of the values in the LoG-filtered image, an estimation can be made for the sub-pixel distances between the actual zero crossing 310 and the respective pair of seed pixels 320, 330. As shown in FIG. 6 for the pair of pixels at the farthest right hand side, the respective distances are d1 and d2, wherein d1+d2=1, wherein the grid size for the pixel distance is the unit distance 1. The respective values for d1 and d2 are assigned to d(x, y) for the respective seed pixels. The distance array d is further initialized by assigning a distance corresponding to infinity within the distance system used to pixel positions not on a seed.

A distance transform gives, for every pixel (x, y) the shortest distance d(x, y) to the nearest seed point. According to an embodiment of the invention any suitable definition for the distance can be used, such as the Euclidean, "city block" or "chessboard" distance. Methods for calculating the distance to the nearest seed point for each pixel are well known in the art, and implementing the invention any suitable method can be used. By way of example an algorithm may be used for the computation of the distance transform as described by G. Borgefors in "Distance transforms in arbitrary dimensions", published in 1984 in Computer vision, graphics and Image processing, pag. 27:321–345, and in particular the disclosed method for the two dimensional situation.

This algorithm is based on two passes over all pixels in the image I(x, y), resulting in values for d(x, y) indicating the distance to the closest seed. The values for d(x, y) are initialized as mentioned before. In the first pass, from the upper left to lower right of image I, the value d(x, y) is set equal to the minimum of itself and each of its neighbors plus the distance to get to that neighbor. In a second pass, the same procedure is followed while the pixels are scanned from the lower right to upper left of the image I. After these two passes, all d(x, y) have their correct values, representing the closest distance to the nearest seed point.

During the two passes where the d(x, y) distance array is filled with the correct values, the item buffer b(x, y) is updated with the identification of the closest seed for each of the pixels (x, y). After the distance transformation, the item buffer b(x, y) has for each pixel (x, y) the value associated with the closest seed. This results in the digital image being segmented; the segments are formed by pixels (x, y) with identical values b(x, y).

In the second example the distances that are computed further in the distance transform algorithm are non-integer values, for example a real number, because of the linear interpolation of the starting values of d(x, y). When comparing for a pixel (x, y) the real-valued d(x, y) values representing the shortest distances to two different seeds, the chance that both distances are different is very large. This allows a unique identification of every pixel as belonging to one single segment. If distances were to be measured in integer values, arbitrary choices would have to be made for each of many pixels that would have the same distance to two seeds. This would lead to increased unwanted raggedness of the border. The invention can however be used with integer distance values; this implementation has lower calculation power requirements, but can lead to slightly less accurate borders.

In the shown examples, the detected hard border fragments did not form a closed contour. However, if closed contours are detected, application of the method according to the invention will result in a single segment, bound by the closed hard border fragment contour.

In the shown examples each pixel is uniquely assigned to a single segment. According to the invention some pixels could be assigned to multiple segments, for example to take in account that segments could result from image features that are partially or fully obscured or overlapped by other image features.

The invention further relates to a computer program product comprising computer program code sections to perform the steps of the method of the invention when run on a computer. The computer program product of the invention can be stored on a suitable an information carrier such as a hard or floppy disc or CD-ROM or stored in a memory section of a computer.

Figure 8:
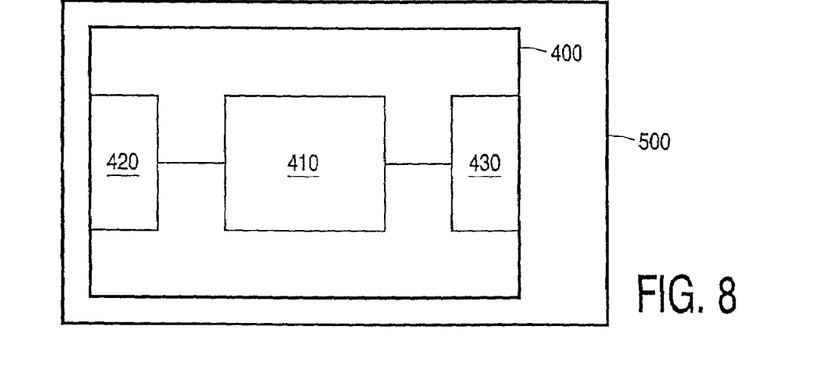
FIG. 8 shows schematically a device for segmenting a digital image.

The invention further relates to a device 400 shown in FIG. 8 for segmenting a digital image. The device 400 is provided with a processing unit 410 for segmenting a digital image according to a method as described above. The processing unit 410 is connected with an input section 420 by which digital images can be received and put through to the unit 410. The unit 410 is further connected to an output section 430 through which processed and segmented images can be outputted. The device 400 may be included in a display apparatus 500, the display apparatus being for example a (3-dimensional) television product.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, the invention provides a method for segmenting a digital image composed of pixels, including determining hard border fragments in the digital image by means of an edge detection process, determining respective sides of each of said hard border fragments, and forming segments by determining for each pixel a closest side and by uniquely assigning each pixel of said digital image to a single segment, corresponding with the determined closest side to the respective pixel.

What is claimed is:

1. A method of segmenting a digital image (10) composed of pixels, the method comprising the steps of:
   determining hard border fragments (a, b, c) in the digital image (10) by means of an edge detection process, comprising the steps of:
   determining respective sides (I, II, III, IV, V, VI, VII) of each of said hard border fragments (a, b, c),
   forming segments (A, B, C, D, E) by determining for each pixel a closest side (I, II, III, IV, V, VI, VII), and by assigning each pixel of said digital image (10) to a segment (A, B, C, D, E) corresponding with the determined closest side (I, II, III, IV, V, VI, VII) to the respective pixel;

determining boundaries of said formed segments, by determining borders for each segment by taking the respective hard border fragments (a, b, c) at least partially bounding respective segments (A, B, C, D, E), determining for each segment soft border fragments essentially contiguous to said hard border fragments (a, b, c) and at least partially bounding respective segments (A, B, C, D, E), by determining a distance to a closest hard segment border fragment (a, b, c), and determining digital image segments (A, B, C, D, E) bordered by respective determined hard border fragments (a, b, c) and said soft border fragments.

2. A method according to claim 1, the method further comprising the steps of:

associating an individual seed comprising seed points, to each of the determined sides, assigning an unique identifier to each seed, determining for each pixel a distance to a closest seed point using a distance determination rule and storing the distance for each pixel in a distance map (d(x,y)), and determining for each pixel the closest seed based on the determined distance to a closest seed point and storing the identity for the determined closest seed for each pixel in an item buffer (b(x,y)).

3. A method according to claim 2, wherein the seed points of a seed are determined as the pixels of the image that are closest to a respective determined side.

4. A method according to claim 1, the method further comprising the steps of:

examining the formed segments for oversegmentation, and removing redundant segments by merging.

5. A method according to claim 1, wherein the edge detection process is based on detecting high contrast border sections.

6. A computer program stored on a computer readable medium for enabling a computer processor to carry out the processing steps of:

determining hard border fragments (a, b, c) in the digital image (10) by means of an edge detection process, comprising the steps of:

determining respective sides (I, II, III, IV, V, VI, VII) of each of said hard border fragments (a, b, c), forming segments (A, B, C, D, E) by determining for each pixel a closest side (I, II, III, IV, V, VI, VII), and by assigning each pixel of said digital image (10) to a segment (A, B, C, D, E) corresponding with the determined closest side (I, II, III, IV, V, VI, VII) to the respective pixel;

determining boundaries of said formed segments, by determining borders for each segment by taking the respective hard border fragments (a, b, c) at least partially bounding respective segments (A, B, C, D, E), determining for each segment soft border fragments essentially contiguous to said hard border fragments (a, b, c) and at least partially bounding respective segments (A, B, C, D, E), by determining a distance to a closest hard segment border fragment (a, b, c), and determining digital image segments (A, B, C, D, E) bordered by respective determined hard border fragments (a, b, c) and said soft border fragments.

7. A computer readable medium containing a computer program thereon, said computer programming operable for causing a computer to execute the steps of:

determining hard border fragments (a, b, c) in the digital image (10) by means of an edge detection process, comprising the steps of:

determining respective sides (I, II, III, IV, V, VI, VII) of each of said hard border fragments (a, b, c), forming segments (A, B, C, D, E) by determining for each pixel a closest side (I, II, III, IV, V, VI, VII), and by assigning each pixel of said digital image (10) to a segment (A, B, C, D, E) corresponding with the determined closest side (I, II, III, IV, V, VI, VII) to the respective pixel;

determining boundaries of said formed segments, by determining borders for each segment by taking the respective hard border fragments (a, b, c) at least partially bounding respective segments (A, B, C, D, E), determining for each segment soft border fragments essentially contiguous to said hard border fragments (a, b, c) and at least partially bounding respective segments (A, B, C, D, E), by determining a distance to a closest hard segment border fragment (a, b, c,), and determining digital image segments (A, B, C, D, E) bordered by respective determined hard border fragments (a, b, c) and said soft border fragments.

8. A computer program stored on a computer readable medium for generating a signal said signal operable for executing the steps of:

determining hard border fragments (a, b, c) in the digital image (10) by means of an edge detection process, comprising the steps of:

determining respective sides (I, II, III, IV, V, VI, VII) of each of said hard border fragments (a, b, c), forming segments (A, B, C, D, E) by determining for each pixel a closest side (I, II, III, IV, V, VI, VII), and by assigning each pixel of said digital image (10) to a segment (A, B, C, D, E) corresponding with the determined closest side (I, II, III, IV, V, VI, VII) to the respective pixel determining boundaries of said formed segments, by determining borders for each segment by taking the respective hard border fragments (a, b, c) at least partially bounding respective segments (A, B, C, D, E), determining for each segment soft border fragments essentially contiguous to said hard border fragments (a, b, c) and at least partially bounding respective segments (A, B, C, D, E), by determining a distance to a closest hard segment border fragment (a, b, c), and determining digital image segments (A, B, C, D, E) bordered by respective determined hard border fragments (a, b, c) and said soft border fragments.

9. Device for segmenting a digital image, the device comprising:

input section (420) for receiving digital images;

means (410) for determining hard border fragments (a, b, c) in the digital image (10) by means of an edge detection process;

means (410) for determining respective sides (I, II, III, IV, V, VI, VII) of each of said hard border fragments (a, b, c), means (410) for forming segments (A, B, C, D, E) by determining for each pixel a closest side (I, II, III, IV, V, VI, VII), and by assigning each pixel of said digital image (10) to a segment (A, B, C, D, E) corresponding with the determined closest side (I, II, III, IV, V, VI, VII) to the respective pixel, means for determining boundaries of said formed segments, by determining borders for each segment by taking the respective hard border fragments (a, b, c) at least partially bounding respective segments (A, B, C, D, E), means for determining for each segment soft border fragments essentially contiguous to said hard border fragments (a, b, c) and at least partially bounding respective segments (A, B, C, D, E), by determining a distance to a closest hard segment border fragment (a, b, c), means for determining digital image segments (A, B, C, D, E) bordered by respective determined hard border fragments (a, b, c) and said soft border fragments; and an output section (430) for providing segmented images.

10. Display apparatus comprising a device, said device comprising:

an input section (420) for receiving digital images;

means (410) for determining hard border fragments (a, b, c) in the digital image (10) by means of an edge detection process;

means (410) for determining respective sides (I, II, III, IV, V, VI, VII) of each of said hard border fragments (a, b, c), means (410) for forming segments (A, B, C, D, E) by determining for each pixel a closest side (I, II, III, IV, V, VI, VII), and by assigning each pixel of said digital image (10) to a segment (A, B, C, D, E) corresponding with the determined closest side (I, II, III, IV, V, VI, VII) to the respective pixel, means for determining boundaries of said formed segments, by determining borders for each segment by taking the respective hard border fragments (a, b, c) at least partially bounding respective segments (A, B, C, D, E), means for determining for each segment soft border fragments essentially contiguous to said hard border fragments (a, b, c) and at least partially bounding respective segments (A, B, C, D, E), by determining a distance to a closest hard segment border fragment (a, b, c), means for determining digital image segments (A, B, C, D, E) bordered by respective determined hard border fragments (a, b, c) and said soft border fragments; and an output section (430) for providing segmented images.

\* \* \* \* \*